United States Patent
Doran

[11] 3,742,782
[45] July 3, 1973

[54] INFINITE GEAR RATIO AUTOMATIC DRIVE TRANSMISSION

[76] Inventor: Wilbur R. Doran, Rt. 2, Kenton, Tenn.

[22] Filed: May 8, 1972

[21] Appl. No.: 251,010

[52] U.S. Cl. .................................. 74/688, 74/863
[51] Int. Cl. ....................... F16h 47/08, B60k 21/00
[58] Field of Search ...................................... 74/688

[56] References Cited
UNITED STATES PATENTS

| | | | |
|---|---|---|---|
| 1,242,974 | 10/1917 | Pinckney | 74/688 |
| 2,635,486 | 4/1953 | Lindsay | 74/688 |
| 2,758,488 | 8/1956 | Caluo | 74/688 |
| 2,982,152 | 5/1961 | DeLorean | 74/688 |
| 3,171,299 | 3/1965 | Miner | 74/688 |
| 3,431,798 | 3/1969 | Dillard et al. | 74/688 |

*Primary Examiner*—Arthur T. McKeon
*Attorney*—John R. Walker, III

[57] ABSTRACT

The subject invention includes the usual planetary gear section, torque converter section, and a master fluid pump. However, the usual low and/or high drive clutch section is non-existent or is superseded by a drum section which includes, internally thereof, a plurality of gear pumps and a bell gear. The drum section is rotatably mounted about the usual transmission input shaft. A metering valve is included for varying the amount of fluid allowed to flow from the master fluid pump to the gear pumps. Opening the meter valve is effective to inundate the gear pumps with fluid which impedes rotation or locks the gear pumps, thus causing the drum section to be carried or rotatably driven by the bell gear, i.e., the transmission output shaft now rotates in unison with the transmission input shaft or an essential 1:1 gear ratio is achieved. Virtually closing the metering valve starves the gear pumps of fluid which is effective to allow the drum section to respond to the rotation of the planetary gear section, i.e., the drum section revolves at the same speed as the transmission input shaft but in an opposite direction of rotation or a neutral condition is achieved. Opening the metering valve slightly to a cracked position commences to load the gear pumps which is effective to cause the drum section to rotate at a lower speed than the input shaft, i.e., in opposite directions but establishing a maximum gear ratio between the transmission input and output shafts. Further impediment, of varying degrees, upon the gear pumps is achieved by varying the setting of the metering valve between the cracked and the fully opened positions. This is effective to provide infinite ratios between the revolutions of the transmission input and output shafts.

3 Claims, 4 Drawing Figures

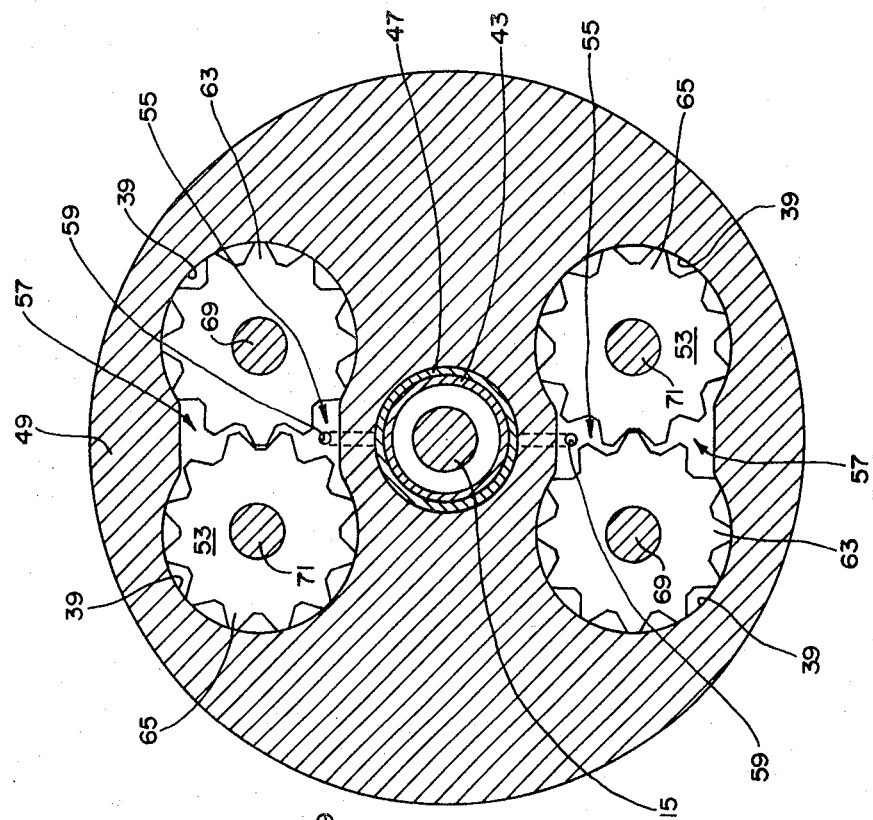
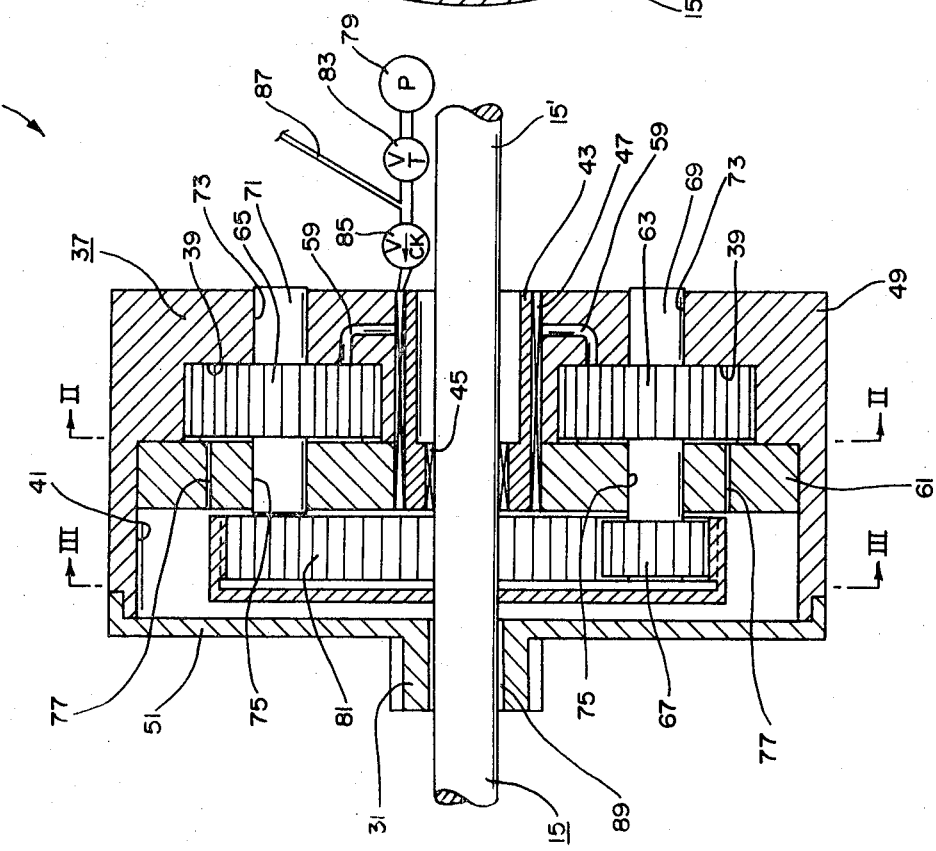

INFINITE GEAR RATIO AUTOMATIC DRIVE TRANSMISSION

BACKGROUND OF THE INVENTION

1. Field of the Invention

This invention relates to the field of automatic drive transmissions.

2. Description of the Prior Art

The usual practice in automatic drive transmissions is to have a high and/or low drive clutch section which is rotatably mounted about the transmission input shaft and is fixedly attached to a low sun gear which is part of a usual planetary gear section. A reverse clutch is included which selectively engages the reverse ring gear of the planetary gear section to cause the output shaft to rotate in a reverse direction and at a reduced speed relative to the input shaft. In neutral, the low band is released, the drive clutch is released, and the reverse clutch is released, which is effective in allowing the planetary gear section to cause reverse rotation of the clutch section at the same speed as the input shaft while the output shaft remains stationary. In low gear, the low band is applied, the drive clutch is released and the reverse clutch is released which is effective to immobilize the low sun gear, thus providing the highest ratio between the input and output shafts. In direct drive the low band is released, the drive clutch is applied, and the reverse clutch is released which in essence locks the clutch section to the input shaft which causes the low sun gear to rotate in unison with the input shaft. This in effect establishes a direct drive between the input and output shafts. In other words, the transmission has one predetermined fixed ratio for the low gear and a 1:1 ratio for the direct drive, i. e., the transmission abruptly changes from the low gear or high ratio to the direct drive. However, certain transmissions shift one or two times before going into direct drive, but the shifts are abrupt and apparent. Additionally, a usual differential has a relatively high ratio between the input and output shafts to provide more power to the driven wheels when the transmission is in the direct drive. This high ratio differential causes high engine rpm which generally results in high fuel consumption.

A preliminary patentability search revealed the following U.S. Pat. Nos.: 1,456,956; 1,599,345; 1,866,066; 1,910,903; 1,966,979; 2,079,691; and 2,246,450. None of the above patents show or suggest applicant's device.

SUMMARY OF THE INVENTION

The present invention is directed towards overcoming the disadvantages and problems relative to previous automatic drive transmissions for vehicles, particularly the problems of erratic shifting and high fuel consumption. The latter problem, in part, may be attributed to a less than optimum ratio betweeen the input and output shafts of prior transmissions, i. e., for the specific torque being coupled thereto. The concept of the present invention is to provide an infinite gear ratio automatic drive transmission which includes the usual planetary gear section, torque converter section, and a master fluid pump. However, the usual low and/or high drive clutch section is non-existent or is superseded by a drum section which includes, internally thereof, a plurality of gear pumps and a bell gear. The drum section is rotatably mounted about the usual transmission input shaft. A metering valve is included for varying the amount of fluid allowed to flow from the fluid pump to the gear pumps.

The gear pumps have an unobstructed inlet and restricted outlet. Therefore, opening the metering valve is effective to inundate the gear pumps with fluid which impedes rotation or locks the gear pumps, thus causing the drum section to be carried by the bell gear, i. e., the transmission output shaft rotates in unison with the transmission input shaft or an essential 1:1 gear ratio is achieved.

Additionally, virtually closing the metering valve starves the gear pumps of fluid which is effective to allow the drum section to respond to the rotation of the planetary gear section, i. e., the drum section revolves in an opposite direction of rotation of the transmission input shaft, i. e., a neutral condition is achieved. 37

Further, opening the metering valve slightly to a cracked position commences to load the gear pumps, which is effective to cause the drum section to rotate at a slower speed than the input shaft, i. e., in opposite directions but establishing a maximum gear ratio between the transmission input and output shaft. This maximum gear ratio is considerably greater than achieved, in prior transmissions, by immobilizing the low sun gear.

Further impediment, of varying degrees, upon the gear pumps is achieved by varying the setting of the metering valve between the cracked and the fully open positions. This is effective to provide inifinite ratios between the revolutions of the transmission input and output shafts.

In addition, a lower ratio differential may be coupled to the transmission of the present invention for fuel economy purposes without negating the power available at the driven wheels. The latter is possible for the following reasons: First, considering only the low range at which the vehicle starts to move from a standing stop, the ratio between the input shaft of the transmission and the driven wheels can remain fixed at the same ratio as heretofore since the transmission of the present invention has a lower gear or higher ratio than prior transmissions.

Secondly, allowing the transmission of the present invention to go into direct drive can be delayed until the vehicle reaches a higher ground speed than prior transmissions. Therefore, a vehicle having the transmission of the present invention and a lower ratio differential incorporated therewith would preferably be constructed to go into direct drive at a higher ground speed than prior transmissions, thus in essence establishing an overdrive or fuel economy feature.

More specifically, a first vehicle, having a prior automatic transmission and the usual high ratio differential incorporated therewith may travel alongside a second vehicle having the transmission of the present invention and a lower ratio differential incorporated therewith. At a predetermined ground speed, e. g., 30 miles per hour or the like, the first vehicle shifts into direct drive. However, the second vehicle is not yet in direct drive but still has the same power or ratio between the input shaft of the transmission and the driven wheels, as does the first vehicle, i. e., the higher ratio of the infinite gear ratio transmission of the present invention compensating for the difference in ratio between the differential of the first vehicle and the second vehicle. At a predetermined ground speed, e. g., 45 miles per hour or the like, the construction features of the second vehicle are such that it now goes into direct drive. In other words, the transmission of the present invention does not shift per se but smoothly goes through the infinite gear ratio spectrum until finally the drum section is essentially locked to the bell gear or its rotates in unison with the input shaft. Therefore, the engine rpm of the second vehicle is considerably less than the rpm of the first vehicle at normal driving speeds resulting in fuel economy.

Another advantage of the transmission of the present invention is it can be effective in reducing pollution of the exhaust from the engine. In other words, the gear ratio between the engine and the drive wheels can be suitably designed to take advantage of the available power of the engine without overloading it. This is particularly factual in regard to diesel engines but the same is believed to be true with regard to gasoline engines under certain conditions.

BRIEF DESCRIPTION OF THE DRAWINGS

FIG. 1 is a sectional view taken as on the vertical centerline of the infinite gear ratio assembly of the present invention, diagrammatically depicting a master pump, a metering valve, and a check valve in a preferred arrangement therewith.

FIG. 2 is a sectional view taken as on the line II—II of FIG. 1.

DESCRIPTION OF THE PREFERRED EMBODIMENT

Figure 4:
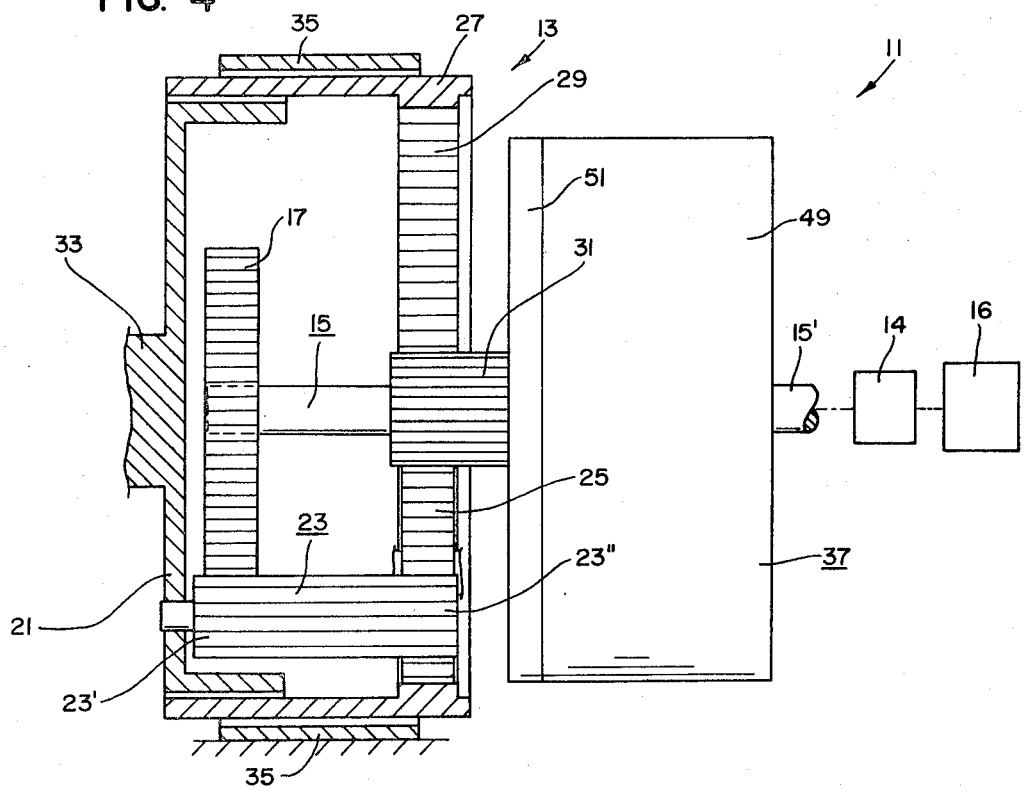
FIG. 4 is a sectional view taken as on the vertical centerline of the usual planetary gear section, shown suitably adapted to the infinite gear ratio assembly depicted in FIG. 1 and showing the prime mover and torque converter diagrammatically.

The inifinite gear ratio assembly 11 of the present invention is depicted in FIG. 4 of the drawings in a preferred environment including a typical planetary gear section 13 which is suitably coupled to a torque converter 14 in a manner obvious to those skilled in the art. In order to gain a thorough understanding of the infinite gear ratio assembly 11 of the present invention, it is desirable to have a complete understanding of the planetary gear section 13 and the torque converter 14. An exhaustive disclosure of the planetary gear section 13 or the torque converter 14 will not be attempted herein. However, it is necessary that the structure of the planetary gear section 13 be disclosed in order to appreciate the infinite gear ratio assembly 11. Accordingly, the planetary gear section 13 includes a transmission input shaft 15 having the end 15' suitably coupled to and rotatably driven by a prime mover 16, e. g., the torque converter 14 being interposed between an internal combustion engine or the like and the assembly 11. It should be understood that the transmission input shaft 15 extends through the infinite gear ratio assembly 11 and terminates within the planetary gear section 13. The planetary gear section 13 also includes an input sun gear 17 which is coupled to the input shaft 15, i. e., mounted onto the shaft 15 for rotation therewith.

Planetary carrier means 21 is included and has at least one long pinion gear 23 suitably journaled to the carrier 21 and having the one end 23' thereof meshingly engaging the input sun gear 17. Also included is at least one short pinion gear 25 meshingly engaging the other end 23'' of the long pinion gear 23. It should be understood that the typical planetary gear section 13 includes a plurality of long pinion gears and a plurality of short pinion gears, e. g., three of each symmetrically arranged therein. Further, the planetary gear section 13 includes a housing 27 which is suitably journaled about the input shaft 15.

An internal reverse ring gear 29 is included which also meshingly engages the short pinion gear 25 and is fixedly attached to the housing 27. Ring gear 29 is disposed in housing 27 substantially as depicted in FIG. 4 of the drawings. Additionally, a low sun gear 31 is included and is concentrically disposed within the reverse ring gear 29 and also meshingly engages the short pinion gear 25. A transmission output shaft 33 is included and preferably is fixedly attached to the planetary carrier means 21.

A reverse band 35 is provided and is suitably actuated so as to frictionally engage the housing 27 when the vehicle drive selector is placed in a reverse position, i. e., all of the above structure being typical and well known to those skilled in the art.

Figure 3:
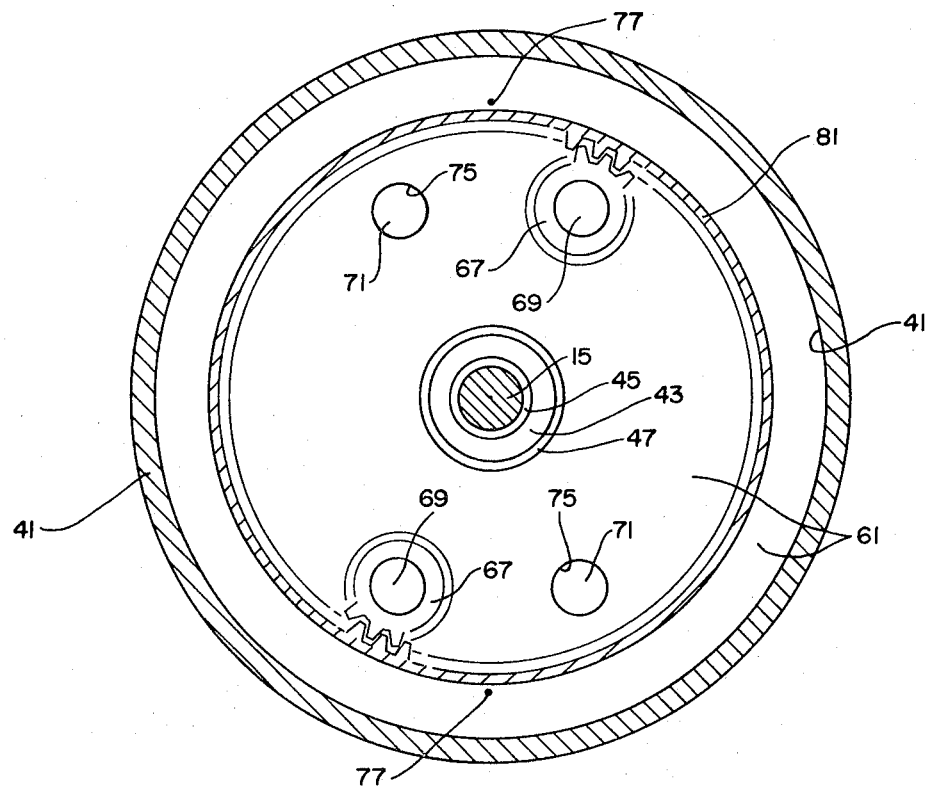
FIG. 3 is a sectional view taken as on the line III—III of FIG. 1.

Referring now to FIGS. 1 – 3 of the drawings wherein it may be seen that the infinite gear ratio assembly 11 includes a drumlike housing 37 which is rotatably mounted about the transmission input shaft 15. The interior of the housing 37 is provided with a plurality of pump chambers 39, i. e., two are shown but several could be included, and a main chamber 41. The pump chambers 39 respectively are shaped substantially as depicted in FIG. 2 of the drawings and the main chamber 41 preferably is circular as depicted in FIG. 3 of the drawings. A sleeve member 43 is included and is journaled to the input shaft 15 by a bearing assembly shown diagrammatically as at 45. The housing 37 is journaled to the sleeve member 43 by a bearing assembly shown diagrammatically as at 47. In other words, the input shaft 15 is free to rotate independent of the housing 37 and the housing 37 is free to rotate about the sleeve member 43 in a manner yet to be described.

The housing 37 includes an annular main body member 49 and a removable annular closure disk 51 suitably attached thereto as with bolts (not shown). The low sun gear 31, being concentrically disposed with respect to the closure disk 51, is fixedly attached to the closure disk 51 in any well known manner, as by welding or the like.

The assembly 11 includes a plurality of slave gear pumps 53, i. e., only two are shown in the drawings, but several may be included. The gear pumps 53 respectively have suction and delivery sides 55, 57 and are disposed within the pump chambers 39, as clearly shown in FIG. 2 of the drawings.

The main body member 49 is provided with a plurality of fluid inlets 59, i. e., each of the pump chambers 39 has a fluid inlet 59 adjacent the suction side 55.

The assembly 11 also includes an annular pump plate 61 received in the circular main chamber 41 and suitably secured to the main body member 49 in any well known manner, as with bolts (not shown). From FIG. 1 of the drawings, it may be seen that the bearing assembly 47 preferably extends inwardly a sufficient distance so as to journal the pump plate 61 to the sleeve member 43.

Each of the pumps 53 include a driven gear member 63 and an idler gear member 65. Further, the respective driven gear members 63 are driven by pinion drive gears 67, i. e., by being keyed to a drive shaft 69. Additionally, the idler gears 65 are received about an idler shaft 71 with the idler gear member 65 meshingly engaging the driven gear member 63 as clearly shown in FIG. 2 of the drawings. More specifically, the main body member 49 is provided with a plurality of suitably arranged apertures 73 for receiving one of the ends of the respective drive and idler shafts 69, 71. Additionally, the pump plate 61 is provided with a plurality of suitably aligned apertures 75 for receiving the other end of the respective drive and idler shafts 69, 71. From FIG. 1 of the drawings, it may be seen that the drive shaft 69 protrudes beyond the pump plates 61 and has the pinion drive gear 67 attached thereto. Additionally, the pump plate 61 is provided with a plurality of very small apertures or fluid outlets 77, i. e., the outlets 77 being adjacent the delivery side 57 of the gear pumps 53. It should be pointed out that the fluid inlets 59 are considerably larger than the fluid outlets 77.

A master fluid pump 79 is included and is communicated with the fluid inlets 59 for delivering fluid under pressure to the gear pumps 53. In other words, the gear pumps 53 are slave gear pumps, meaning they depend upon the master fluid pump 79 for obtaining fluid and are controlled by the master fluid pump 79 in a manner yet to be disclosed.

The assembly 11 also includes an internal bell gear 81 as shown in FIGS. 1 and 3 of the drawings. The bell gear 81 is disposed in the main chamber 41 and includes means, e. g., spline gears (not shown) concentrically thereof for locking the bell gear 81 to the transmission input shaft 15 in a manner well known to those skilled in the art. The bell gear 81 meshingly engages the plurality of pinion drive gears 67. Therefore, rotation of the input shaft 15 rotatably drives the bell gear 81 which in turn drives the slave gear pumps 53, causing a predetermined maximum quantity of fluid to be forced through the fluid outlets 77. It should be noted that the master fluid pump 79 has a volumetric output which is in excess of the total of th predetermined quantities of fluid which may pass through the plurality of fluid outlets 77, i. e., the significance of which will be disclosed later in the specification.

The assembly 11 also includes a metering valve 83 for controlling the flow of fluid from the master pump 79 to the slave pumps 53. From FIG. 1 of the drawings, it may be seen that the metering valve 83 is interposed between the master pump 79 and the slave pumps 53. Therefore, closing the metering valve 83 starves the slave pumps 53 of fluid and opening the metering valve 83 allows passage of fluid to the slave pumps 53. It will be appreciated by those skilled in the art that automatic operation of the metering valve 83 between the open and closed positions and to infinite intermediate positions therebetween may be accomplished in any well known manner, e. g., suitably adapting a governor thereto, adapting the valve 83 to sense and respond to changes in manifold vacuum, by mechanical linkage which may be moved by changing throttle settings, or by manual means.

Opening the metering valve 83 forces more fluid into the pump chambers 39 than the slave pumps 53 can force through the restricted outlets 77. This places a load on the gear pumps 53 which impedes rotation of the pinion drive gears 67. Thus, the bell gear 81, being locked to the rotating input shaft 15, carries the pinion drive gears 67 in orbit about the shaft 15, which causes the drumlike housing 37, the low sun gear 31, and the transmission output shaft 33 to rotate in unison with the input shaft 15. In other words, this establishes a 1:1 ratio between the revolutions of the input shaft 15 and the transmission output shaft 33.

The metering valve 83 has a second position or a substantially closed position wherein the valve 83 restricts the flow of fluid to the slave pumps 53. It will be appreciated by those skilled in the art that when the load is substantially nil on the slave pumps 53, the low sun gear 31 responds to the planetary gear section 13 in a manner that causes the low sun gear 31 and the drumlike housing 37 to rotate in a direction of rotation that is opposite to the direction of rotation of the transmission input shaft 15 while the output shaft 33 remains stationary. In other words, this establishes a neutral condition which enables the engine of the vehicle to cause the input shaft 15 to rotate at various rpm's without moving the drive wheels of the vehicle. Therefore, the metering valve 83 would be moved to the second position or closed when the drive selector of the vehicle is placed in park or neutral and would remain closed regardless of the rpm of the input shaft 15. Additionally, the metering valve 83 might be moved to the second or closed position when the throttle is at an idle position regardless of the position in which the drive selector may be placed, i. e., the drive selector may be in drive or reverse, but the drive wheels thereof will not rotate until the throttle is opened a predetermined amount. However, it is not necessary to shift the transmission to neutral when the engine is idling since normal slippage of the torque converter 14 will accomplish the same purpose.

It should now be apparent to those skilled in the art that properly positioning the metering valve 83, i. e., at infinite positions between the first or wide open position and the second or substantially closed position, is effective in establishing infinite ratios between the revolutions of the input shaft 15 and the output shaft 33. Additionally, the changing of the ratio from a low range to a high range is totally undetectable, i. e., remarkably void of abrupt steps as is common in prior transmissions. Further, prior transmissions depended upon the locking of the low sun gear in order to achieve a low range and abruptly locking a clutch assembly which might be compared to the drumlike housing 37 for achieving the high range. Therefore, it will be appreciated that the infinite gear ratio assembly 11 of the present invention starts out at a lower gear ratio than heretofore, i. e., a slight impediment of the slave pumps 53 starts to slow the drumlike housing 37 somewhat, thus establishing a lower gear ratio than instantly locking the low sun gear 31 as heretofore. In other words, the vehicle is already moving at a nominal speed by the time the low sun gear 31 is stationary. Equally important is the fact that the low sun gear 31 does not remain stationary until the 1:1 ratio is achieved. In other words, the gradual increasing of the impediment of the slave pumps 53 gradually increases the speed of the low sun gear 31 until there is no relative rotation between the pinion drive gears 67 and the bell gear 81 at which time the 1:1 ratio is achieved.

The assembly 11 includes a check valve 85 which prevents reverse flow of the fluid when decelerating the vehicle or when going down a grade. The check valve 85 also prevents forming of air pockets within the chambers 39, 41. In other words, when decelerating, the engine throttle setting is moved to the idle position which might close the metering valve 83. Therefore, without the check valve 85 being interposed between the metering valve 83 and the slave pumps 53, the gear pumps 53 would eventually force all the fluid in the system out through the inlets 59 which would in essence place the vehicle in free wheeling, i. e., eliminating the desirable braking effect that an engine normally contributes in decelerating. In this regard, I also prefer that the system 11 include a fluid bypass 87 to allow a predetermined quantity of fluid to bypass the metering valve 83, i. e., regardless of whether the valve 83 is open or closed. This will maintain sufficient fluid on the delivery side 57 of the gear pumps 53 when the valve 83 is closed to prevent any diminishing of the braking effect of the engine and to also keep fluid circulating to lubricate the functioning structure of the assemblies 11, 13.

From FIG. 1 of the drawings, it may also be seen that a fluid passageway 89 is provided between the low sun gear 31 and the input shaft 15. In other words, the fluid emanating outwardly from the outlet 77 spills into the main chamber 41 and is forced through the fluid passageway 89 on into the housing 27 for the planetary gear section 13, thus providing fluid for lubricating the planetary gear section 13.

Although the invention has been described and illustrated with respect to a preferred embodiment thereof, it is to be understood that it is not to be so limited since changes and modifications may be made therein which are within the full intended scope of the present invention.

I claim:

1. An improvement in a vehicle having a prime mover, a transmission input shaft rotatably driven by said prime mover, an input sun gear directly coupled to said input shaft, planetary carrier means, at least one long pinion gear journaled to said carrier means and having one end thereof meshingly engaging said input sun gear, at least one short pinion gear meshingly engaging the other end of said long pinion gear, a reverse ring gear also meshingly engaging said short pinion gear, a low sun gear concentrically disposed within said reverse ring gear and also meshingly engaging said short pinion gear, and a transmission output shaft fixedly attached to said planetary carrier means; said improvement comprising drumlike housing means rotatably mounted about said transmission input shaft and having the interior thereof provided with a plurality of pump chambers and a main chamber, said housing being fixedly attached to said low sun gear, a plurality of slave gear pump means having suction and delivery sides and being respectively disposed within said pump chambers, each of said pump chambers having a fluid inlet adjacent said suction side and a fluid outlet adjacent said delivery side with said fluid inlets being considerably larger than said fluid outlets, master fluid pump means communicated with said fluid inlets for delivering fluid under pressure to said slave gear pump means, each of said gear pump means including a pinion drive gear, a bell gear disposed in said main chamber and mounted on said transmission input shaft for rotation therewith, said bell gear meshingly engaging said plurality of pinion drive gears to drive said plurality of slave gear pump means which forces a predetermined maximum quantity of fluid respectively through said fluid outlets, said master fluid pump means having a volumetric output which is in excess of the total of said predetermined quantities of fluid, and metering valve means for controlling the flow of fluid from said master pump means to said slave pump means, said metering valve means being interposed between said master pump means and said slave pump means, said metering valve means having a first substantially open position wherein said master pump means inundates said slave pump means with fluid to prevent rotation of said pinion drive gears which is effective to cause said drumlike housing means, said low sun gear, and said transmission output shaft to rotate in unison with said transmission input shaft, said metering valve means having a second position in which said valve means restricts the flow of fluid and wherein said drumlike housing means and said low sun gear revolve in a direction of rotation which is opposite to the direction of rotation but at the same speed as said transmission input shaft while said output shaft remains stationary, and said metering valve means being variable between said first and second positions to provide infinite ratios between the revolutions of said transmission input and output shafts.

2: The combination of claim 1 in which is included check valve means for preventing reverse flow of fluid from said slave pump means towards said master pump means, said check valve means being interposed between said master and said slave pump means.

3: The combination of claim 1 in which is included fluid bypass means for bypassing said predetermined maximum quantity of fluid around said metering valve.

* * * * *